US012790274B2

(12) United States Patent
Wagle et al.

(10) Patent No.: US 12,790,274 B2
(45) Date of Patent: Nov. 10, 2026

(54) METHOD TO USE LOSS CIRCULATION MATERIAL COMPOSITION COMPRISING ALKALINE NANOPARTICLE-BASED DISPERSION AND FORMATE ACTIVATOR IN DOWNHOLE CONDITIONS

(71) Applicant: SAUDI ARABIAN OIL COMPANY, Dhahran (SA)

(72) Inventors: Vikrant Wagle, Dhahran (SA); Rajendra Kalgoankar, Dhahran (SA); Abdullah Al-Yami, Dhahran (SA); Mohammad AlHarthi, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 472 days.

(21) Appl. No.: 18/450,958

(22) Filed: Aug. 16, 2023

(65) Prior Publication Data

US 2025/0059092 A1 Feb. 20, 2025

(51) Int. Cl.

*C04B 28/26* (2006.01)
*C09K 8/504* (2006.01)
*C09K 8/506* (2006.01)

(52) U.S. Cl.

CPC ............ *C04B 28/26* (2013.01); *C09K 8/5045* (2013.01); *C09K 8/506* (2013.01); *C09K 2208/10* (2013.01)

(58) Field of Classification Search

CPC ... C04B 28/26; C04B 28/24; C04B 2103/445; C04B 2103/46; C09K 8/5045; C09K 8/506; C09K 2208/10; C09K 8/487; C09K 8/516

See application file for complete search history.

(56) References Cited

U.S. PATENT DOCUMENTS

| | | | | |
|---|---|---|---|---|
| 4,732,213 | A | 3/1988 | Bennett et al. | |
| 5,320,171 | A | 6/1994 | Laramay | |
| 7,013,973 | B2 | 3/2006 | Danican et al. | |
| 7,458,424 | B2 | 12/2008 | Odeh et al. | |
| 7,934,557 | B2 | 5/2011 | Nguyen | |
| 7,954,549 | B2 | 6/2011 | Lende et al. | |
| 9,045,965 | B2 | 6/2015 | Patil et al. | |
| 9,133,386 | B2 | 9/2015 | Kumar et al. | |
| 10,053,613 | B1 * | 8/2018 | Kalgaonkar | C04B 28/24 |
| 10,066,148 | B2 | 9/2018 | Luyster et al. | |
| 10,351,755 | B2 | 7/2019 | Wagle et al. | |
| 10,407,609 | B2 | 9/2019 | Kalgaonkar et al. | |
| 10,759,986 | B2 | 9/2020 | Wagle et al. | |
| 11,299,662 | B2 | 4/2022 | Wagle et al. | |
| 11,718,776 | B2 | 8/2023 | Wagle et al. | |
| 2006/0234875 | A1 * | 10/2006 | Oyler | C09K 8/44 507/229 |
| 2011/0094746 | A1 | 4/2011 | Allison et al. | |
| 2018/0155602 | A1 | 6/2018 | Zhang et al. | |
| 2018/0327649 | A1 * | 11/2018 | Kalgaonkar | C09K 8/426 |
| 2022/0213374 | A1 | 7/2022 | Zhang et al. | |

FOREIGN PATENT DOCUMENTS

| | | | | |
|---|---|---|---|---|
| WO | 2015/041703 | A1 | 3/2015 | |
| WO | WO-2021225681 | A1 * | 11/2021 | C09K 8/04 |

OTHER PUBLICATIONS

Effect of colloidal nano silica on mechanical and physical behavior of waste glass cement mortar by M aly M Hashmi A Olabi M Messeiry E Abadir and A Hussain—M Aly et al / Materials and design 33 (2012 127-135) (Year: 2012).*

* cited by examiner

*Primary Examiner* — Pamela H Weiss
(74) *Attorney, Agent, or Firm* — Osha Bergman Watanabe & Burton LLP

(57) ABSTRACT

A loss circulation material (LCM) includes an alkaline nanosilica dispersion and a formate activator. The formate activator may be present in an amount in a range of 1 wt % to 40 wt % of the loss circulation material. A method of controlling loss circulation in a loss circulation zone (LCZ) in a wellbore includes introducing an alkaline nanosilica dispersion into the wellbore, introducing a formate activator solution into the wellbore, contacting the alkaline nanosilica dispersion with the formate activator, thereby forming a LCM composition, and forming a gelled solid from the LCM in the loss circulation zone. A method of controlling loss circulation in a LCZ in a wellbore includes introducing a LCM that includes an alkaline nanosilica dispersion and a formate activator into the wellbore such that they contact the LCZ, and forming a gelled solid from the LCM in the LCZ.

6 Claims, No Drawings

METHOD TO USE LOSS CIRCULATION MATERIAL COMPOSITION COMPRISING ALKALINE NANOPARTICLE-BASED DISPERSION AND FORMATE ACTIVATOR IN DOWNHOLE CONDITIONS

BACKGROUND

During the drilling of subterranean wells, such as subterranean wells used in hydrocarbon development operations, the wellbore of the subterranean well can pass through a zone that has induced or natural fractures, are cavernous, or otherwise have an increased permeability compared with solid rock. Such a zone is known as a lost circulation zone. In such a case, the drilling mud and other fluids that are pumped into the well can flow into the lost circulation zone and become irretrievable. When unacceptable drilling fluid losses are encountered, loss circulation materials are introduced into the drilling fluid from the surface. The revised fluid that includes the loss circulation materials is pumped downhole as part of the standard well circulation system. The revised fluid passes through a circulation port to plug and pressure seal the exposed formation at the point where losses are occurring. Once sealing has occurred and acceptable fluid loss control is established, drilling operations can resume.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a loss circulation material including an alkaline nanosilica dispersion and a formate activator. The formate activator may be present in an amount in a range of 1 wt % to 40 wt % of the loss circulation material.

In another aspect, embodiments disclosed herein relate to a method of controlling loss circulation in a lost circulation zone in a wellbore that includes introducing an alkaline nanosilica dispersion into the wellbore, introducing a formate activator solution into the wellbore, contacting the alkaline nanosilica dispersion with the formate activator, thereby forming a loss circulation material composition, and forming a gelled solid from the loss circulation material in the lost circulation zone.

In another aspect, embodiments herein are directed to a method of controlling lost circulation in a lost circulation zone in a wellbore that includes introducing a loss circulation material that includes an alkaline nanosilica dispersion and a formate activator into the wellbore such that they contact the lost circulation zone, and forming a gelled solid from the loss circulation material in the lost circulation zone.

Other aspects and advantages of the claimed subject matter will be apparent from the following description and the appended claims.

DETAILED DESCRIPTION

One or more embodiments in accordance with the present disclosure relate to loss circulation materials and methods to use such loss circulation materials (LCM) in downhole conditions. More specifically, embodiments herein are directed to LCM compositions including gel forming compositions, and methods for producing a solid gel from the LCM.

The LCM composition of one or more embodiments utilizes network structures formed from the alkaline nanosilica and formate activator to form a gelled material. The nanosilica gelling may advantageously be controlled by varying the relative concentration of the formate activator, allowing the gel to selectively form in the lost circulation zone. Further, the gelling tendency of the system can be accelerated by changing the pH of the system, such as with an acidic activator. Additionally, such gels formed may be used at elevated temperatures and advantageously utilizes environmentally friendly ingredients. Even further, it is theorized that use of such a loss circulation material or a pill containing such a loss circulation material may be compatible with any suitable type of drilling fluid.

As used throughout, "lost circulation zone" refers to an area encountered during drilling operations where the volume of drilling fluid returning to the surface is less than the volume of drilling fluid introduced to the wellbore. The lost circulation zone can be due to any kind of opening between the wellbore and the subterranean formation. Lost circulation zones that can be addressed by the solid gel based LCM from an LCM composition described herein can range from minor lost circulation or seepage loss to complete fluid loss.

For instance, minor loss circulation and seepage lost circulation is generally less than 10 barrels per hour (bbl/hr). However, minor lost circulation and seepage lost circulation can be greater or less than 10 bbl/hr depending on the base components of the drilling fluid and other suitable conditions. One of skill in the art would appreciate the various conditions that can define a minor or seepage lost circulation event.

"Moderate loss circulation" is a term for any lost circulation between seepage lost circulation and severe lost circulation and consists of any medium rate of lost circulation, for example, between 10 to 100 barrels per hour (bbl/hr), 10 to 50 barrels per hour (bbl/hr), or 10 to 30 barrels per hour (bbl/hr).

"Severe loss circulation" is a term including any suitable high rate of lost circulation. Non-limiting examples of severe loss circulation include greater than 100 barrels per hour (bbl/hr), greater than 50 barrels per hour (bbl/hr), or greater than 30 barrels per hour (bbl/hr).

LCM Composition

In one aspect, embodiments herein are directed toward an LCM composition including an alkaline nanosilica dispersion and a formate activator. The LCM composition including an alkaline nanosilica dispersion and a formate activator may form a solid or a gelled solid upon contact. In some embodiments, the LCM composition may be configured to form a solid or a gelled solid upon contact in a reservoir. The LCM composition may form a gelled solid proximate to a lost circulation zone in a reservoir.

Alkaline silica nanoparticles useful according to embodiments herein may include nanoparticles formed from any type of alkaline silicate, including sodium silicate and potassium silicate, among others. In some embodiments, the alkaline nanosilica dispersion does not include sodium silicate (i.e., is in the absence of sodium silicate). An example of a commercially available alkaline nanosilica dispersion may include, but is not limited to, IDISIL SI 4545 (Evonik Industries, Essen, Germany), alkaline nanosilica dispersions made by Nuryon, among others.

The alkaline nanosilica dispersion may be a nanosilica particle composition having a pH between 8.5 and 11.5. In one or more embodiments, the alkaline nanosilica dispersion may have a pH between 9 and 11, or between 9.5 and 10.5, when measured at room temperature. The alkaline silica nanoparticle dispersion may have a pH with a lower limit of any one of 8.5, 8.75, 9, 9.5, 10, or 10.5 with an upper limit of any one of 9, 9.5, 10, 10.5, 11, or 11.5, where any lower limit may be paired with any mathematically compatible upper limit.

In some embodiments, the alkaline silica nanoparticles may have an average particle size between 1 nanometers (nm) and 100 nm, such as between 5 nm and 95 nm. In some embodiments the alkaline silica nanoparticles may be between 5 nm and 50 nm, alternately between 5 nm and 20 nm, alternately between 20 nm and 40 nm, alternately between 40 nm and 60 nm, alternately between 60 nm and 80 nm, and alternately between 80 nm and 100 nm. More specifically, the smaller average particle size of the alkaline silica nanoparticles in the alkaline nanosilica dispersion promotes faster gelling than silica particles.

The alkaline silica nanoparticles can have a greater surface area than larger silica particles (e.g., silica particles with an average particle size distribution in the micron range). As will be appreciated by those skilled in the art, a smaller particle size results in a greater surface area to volume ratio, which may allow for tuning of the reactivity of the silica nanoparticles based on available surface area. The surface area of alkaline silica nanoparticles may be between 100 square meters per gram (m2/g) and 500 $m^2/g$, alternatively between 100 $m^2/g$ and 200 $m^2/g$, alternatively between 200 $m^2/g$ and 300 m2/g, alternatively between 300 $m^2/g$ and 400 $m^2/g$, and alternatively between 400 $m^2/g$ and 500 $m^2/g$. Without being bound to a particular theory, the greater surface area of the alkaline silica nanoparticles can affect the rate of gelation and the nature of the gels formed.

The alkaline silica nanoparticles can have a silicon dioxide content ($SiO_2$) in range from 10 percent by weight (wt %) to 65 wt % based on the total weight of the dispersion. The $SiO_2$ content may be in a range with a lower limit of any one of 10, 15, 20, 25, 30, 40, and 45 wt % and an upper limit of any one of 20, 25, 30, 35, 40, 45, 55, 60, and 65 wt %, where any lower limit may be paired with any mathematically compatible upper limit. The $SiO_2$ content may affect the gelation rate of the LCM composition. For example, the greater the concentration of $SiO_2$ in the nanosilica of the alkaline nanosilica dispersion, the faster rate of gel formation.

The concentration of the alkaline silica nanoparticles in the alkaline nanosilica dispersion may be between 5 percent by weight (wt %) and 60 wt %. The concentration of nanosilica in the alkaline nanosilica dispersion may affect the rate of gel formation, the greater the concentration of nanosilica in the alkaline nanosilica dispersion the faster rate of gel formation. The concentration of the alkaline nanosilica dispersion in the nanosilica dispersion can be between 5 wt % and 60 wt %, such as in the range from 20 wt % to 50 wt %, or in the range from about 25 wt % to about 50 wt %, or in the range from about 35 wt % to about 45 wt % or 40 wt % to 50 wt %.

The alkaline silica nanoparticle dispersion may have a specific gravity (i.e., density) in a range of from about 1.0 gram per milliliter (g/mL) to about 2.0 g/mL, such as from about 1.0 g/mL to about 1.8 g/mL, from about 1.0 g/mL to about 1.7 g/mL, from about 1.0 g/mL to about 1.6 g/mL, from about 1.0 g/mL to about 1.5 g/mL, from about 1.0 g/mL to about 1.4 g/mL, from about 1.05 g/mL to about 1.8 g/mL, from about 1.05 g/mL to about 1.7 g/mL, from about 1.05 g/mL to about 1.6 g/mL, from about 1.05 g/mL to about 1.5 g/mL, or from about 1.05 g/mL to about 1.4 g/mL. In one or more embodiments, the alkaline silica nanoparticles may have a density in a range with a lower limit of any one of 1.0, 1.25, 1.3, 1.4, 1.5, 1.6, 1.65, 1.7, or 1.75 g/mL an upper limit of any one of 1.25, 1.3, 1.35, 1.4, 1.45, 1.5, 1.55, 1.6, 1.65, 1.7, 1.75, 1.8, 1.85, 1.9, or 2.0 g/mL, where any lower limit may be paired with any mathematically compatible upper limit.

The viscosity of the acidic silica nanoparticle dispersion may be in a range of from 1 to 50 centipoise (cP) at room temperature (e.g., from about 20° C. to about 25° C.) and low shear rate (from about 500 reciprocal seconds ($s^{-1}$) to about 550 $s^{-1}$, or from about 500 $s^{-1}$ to about 520 $s^{-1}$), such as from 1 to 25 cP, from 1 to 20 cP, from 1 to 15 cP, from 1 to 10 cP, or from 1 to 5 cP. The alkaline silica nanoparticle dispersion may have a viscosity in a range with a lower limit of any one of 1, 2, 5, 10, 15, 17.5, 20, 22.5, 25, 30, 40, or 45 cP at room temperature with an upper limit of any one of 15, 17.5, 20, 22.5, 25, 30, 35, 40, 45, or 50 cP at room temperature, where any lower limit may be paired with any mathematically compatible upper limit.

Formation of a gel according to embodiments herein may be initiated by contact of the silica nanoparticle dispersion with an activator. The formate activator may be selected from the group consisting of sodium formate, potassium formate, cesium formate, and combinations thereof. In one or more embodiments, the formate activator is sodium formate.

The amount of formate activator used, for example, may depend upon the method used for introduction of the LCM into the lost circulation zone; when pre-mixed, a longer gel time may be desirable. The formate activator may be used at a weight ratio to the alkaline nanosilica dispersion in a range from 0.01:1 to 1:1. As noted above, the ratio of the activator to the alkaline nanosilica may impact the gelation time. In some embodiments, the formate activator may be present in an amount in a range from 1 wt % to 40 wt % of the loss circulation material; such as from a lower limit of 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, or 25 wt % to an upper limit of 20 wt %, 21 wt %, 22 wt %, 23 wt %, 24 wt %, 25 wt %, 26 wt %, 27 wt %, 28 wt %, 29 wt %, 30 wt %, 35 wt %, or 40 wt %, where any lower limit may be combined with any mathematically compatible upper limit.

In one or more embodiments, the LCM composition may further include a gelation accelerator. A gelation accelerator useful according to embodiments herein may include, but are not limited to, an aqueous solution of one or more compounds selected from the group consisting of organic acids, mineral acids, and combinations thereof. Organic acids include, but are not limited to, acetic acid, formic acid, carbonic acid, methanesulfonic acid, toluenesulfonic acid, among others. Mineral acids include, but are not limited to hydrochloric acid, hydrofluoric acid, hydroiodic acid, sulfuric acid, nitric acid, among others.

The gelation accelerator may be used at a weight ratio to the alkaline nanosilica dispersion in a range from 0.01:1 to 0.1:1. In some embodiments, the gelation accelerator may be used at a weight ratio to the alkaline nanosilica dispersion. As such, the amount of gelation accelerator to include may be determined through laboratory experiments.

In some embodiments, the gelation accelerator is be present in an amount in a range from 1 wt % to 45 wt % of the loss circulation material (inclusive of the gelation accelerator, the formate activator, and the alkaline nanosilica dispersion); such as from a lower limit of 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %. 23 wt %, 24 wt %, or 25 wt % to an upper limit of 20 wt %, 21 wt %, 22 wt %, 23 wt %, 24 wt %, 25 wt %, 26 wt %, 27 wt %, 28 wt %, 29 wt %, 30 wt %, 35 wt %, 40 wt %, 45 wt % or 50 wt %, where any lower limit may be combined with any mathematically compatible upper limit.

An LCM composition prior to the addition of a gelation accelerator has an initial pH in a range as described above. The LCM composition after the addition of a gelation accelerator may have a decreased pH in a range from 2 to 4.

One or more embodiments of the LCM composition also includes a base material additive commonly found in LCM materials. Suitable additives include one or more not limited to the following: polymers, corn stalks, rice hulls, cotton burrs, corn cobs, tree bark, animal hair, mineral fibers, citrus pulp, shredded paper, ground peanut shells, mica flakes, mica, fibrous material, cellophane, walnut shells, flaky material, plastic pieces, marble, wood, wood chips, formica, plant fibers, cottonseed hulls, ground rubber, polymeric materials, and nut hulls, among other LCM materials commonly used in the art.

As mentioned above, an LCM composition including an alkaline nanosilica dispersion and a formate activator may effectively and efficiently form a gel sufficient for reducing lost circulation. When heated to a sufficient triggering temperature, the formate activator may react with the nanoparticle dispersion to increase the viscosity of the treatment fluid. Without being bound by any particular theory, the formate activator may prevent the counterions of the nanoparticle dispersion from forming a charge-neutral layer around the silica nanoparticles, which may allow the nanoparticles of the dispersion to coalesce and form a silica gel.

In one or more other embodiments, an LCM composition includes an alkaline nanosilica dispersion, a formate activator, a gelation accelerator, and a viscosifier, which may be used for reducing lost circulation. In one or more other embodiments, an LCM composition includes an alkaline nanosilica dispersion, a formate activator, and a gelation accelerator, which may be used for reducing lost circulation.

The LCM composition contains less than 5% by weight salts, according to one or more embodiments herein. In other embodiments, the LCM composition may contain less than 4% by weight salts, less than 3% by weight salts, less than 2% by weight salts, less than 1% by weight salts, or less than 0.1% by weight salts. In one or more embodiments, the LCM composition contains less than 0.1% by weight salts. Salts in the LCM composition can result in untimely conversion of the LCM composition into the solid gel loss circulation material.

Embodiments herein may be useful over a wide range of downhole conditions, including temperatures of up to 250° C., such as up to about 200° C., up to about 175° C., up to about 150° C., up to about 125° C., or up to about 100° C. Downhole pressures may be from about 50 pounds per square inch (psi) (0.345 megapascals (MPa)) to about 30,000 psi (206 MPa), such as from about 100 psi (0.689 MPa) to about 30,000 psi, from about 1,000 psi (6.90 MPa) to about 30,000 psi, from about 50 psi to about 20,000 psi (138 MPa), from about 100 psi to about 20,000 psi (68.9 MPa), from about 1,000 psi to about 20,000 psi, from about 50 psi to about 10,000 psi, from about 100 psi to about 20,000 psi, or from about 1,000 psi to about 10,000 psi. At these downhole conditions, the composition may solidify within 16 hours (gelling time) downhole. The gelling time is not limited to 16 hours and may be less, such as 14 hours or less, 12 hours or less, or 10 hours or less.

In one or more embodiments, the time to form a gelled solid (or "gelation time") is from 6-24 hours, from 12-24 hours, from 6-12 hours, from 1-24 hours, or from 1-12 hours. The gelation time may be in a range with a lower limit of any one of 1, 2, 3, 5, 6, 7.5, 8, 9, 10, or 12 hours with an upper limit of any one of 6, 8, 10, 12, 12.5, 14, 16, 20, 22, 23, 23.5, or 24 hours, where any lower limit may be paired with any mathematically compatible upper limit.

Method of Treating a Lost Circulation Zone

In another aspect, embodiments herein relate to a method of producing a solid gel based loss circulation material by contacting the alkaline nanosilica dispersion with a formate activator, a gelation activator, or both. In some embodiments, the alkaline nanosilica dispersion, the formate activator, the gelation activator, or combinations thereof are added to an aqueous-based drilling mud. The amount of the alkaline nanosilica dispersion added to the aqueous-based drilling mud may depend on the mud weight of the aqueous based drilling mud.

As mentioned above, the combination of alkaline silica nanoparticle dispersion and formate activator forms a gelled solid based LCM. In one or more embodiments, the formate activator acts as an activator that promotes aggregation of alkaline nanosilica particles in the nanosilica dispersion. The formation of gels using the combination of nanosilica dispersions and formate activator according to embodiments herein may decrease loss of drilling fluids in any suitable type of lost circulation zone.

Without wanting to be bound by theory, addition of a formate activator, a gelation accelerator, or both to the alkaline nanosilica dispersion results in weakened repulsive interactions between the alkaline silica nanoparticles, leading to collisions of the nanoparticles in the dispersion. Collision of nanoparticles results in aggregation of nanosilica into long chain-like networks caused by formation of siloxane (Si—O—Si) bonds and subsequently results in gelling of the alkaline nanosilica dispersion.

In one or more embodiments, the alkaline nanosilica is introduced into the wellbore such that the alkaline nanosilica contacts the lost circulation zone. Subsequently, the formate activator may be introduced into the lost circulation zone in downhole conditions to contact the nanosilica dispersion. Contacting the formate activator with the alkaline nanosilica results in the formation of a gelled solid formed from the reaction of the alkaline nanosilica and the formate activator, reducing the rate of lost circulation in the lost circulation zone.

In other embodiments, the alkaline nanosilica and the formate activator may be mixed and then subsequently introduced into the lost circulation zone. The mixture thus introduced to the lost circulation zone may form a gelled solid, resulting in decreased fluid loss.

Formation of a gel according to embodiments herein may be initiated, such that gelation of the LCM composition is accelerated, by contact of the above-described alkaline silica nanoparticles and formate activator with a gelation accelerator as described above. The gelation accelerator may decrease the pH of a mixture of the alkaline silica nanoparticles and the formate activator. The ratio of the gelation accelerator to the formate activator and alkaline nanosilica dispersion may impact the gelation time, such that a higher ratio of the gelation accelerator to the formate activator and alkaline nanosilica dispersion decreases the gelation time.

Alternatively, a lower ratio of the gelation accelerator to the formate activator and alkaline nanosilica dispersion increases the gelation time.

In some embodiments, the gelling time (the time for which the nanosilica dispersion begins to form a gel) of the alkaline nanosilica dispersion may be controlled. For example, the gelling time may be affected by the concentration of formate activator, the gelation accelerator, or both. The gelling tendency of the system may be accelerated by changing the pH of the system from alkaline to acidic, where the more acidic the system, the faster the gel formation occurs.

In some embodiments, the gelation time is increased by increasing the gelation activator concentration. Increasing the concentration of the gelation accelerator may decrease the gelation time. The temperature of the formation, the pressure of the formation, or both may affect the gelation time. For example, a higher formation temperature and higher formation pressure may decrease the gelation time. The gel formation may be dependent on the concentration of the formate activator in solution, the concentration of nanosilica particles in the dispersion, or both. For example, a lower concentration of the formate activator may not lead to gelation.

In at least one embodiment of the method to produce a solid gel LCM, when a lost circulation zone is encountered, an LCM composition in the form of a pill is produced by mixing the alkaline nanosilica dispersion and the formate activator. The LCM composition pill can be introduced into the wellbore. The LCM composition pill can be allowed to migrate to the lost circulation zone. The volume of the LCM composition pill can be based on the size of the lost circulation zone, as estimated based on the volume of lost drilling fluid. The amount of gelation accelerator can be based on the desired gel formation time. The solid gel LCM then forms in the lost circulation zone and the solid gel LCM circulation material fills the lost circulation zone, reducing or eliminating fluid loss. Similar considerations and effects may be use in other embodiments where the alkaline nanosilica is introduced to the wellbore in a first pill prior to contact of the nanosilica with the formate activator, introduced in a second pill.

Example 80 grams of alkaline nanosilica dispersion (IDISIL SI 4545, Evonik Industries, Essen, Germany) was added to a beaker. Typical properties of alkaline nanosilica dispersion used in one or more embodiments is provided in Table 1.

TABLE 1

Alkaline Nanosilica Dispersion Properties

| Particle size-Titrated (nm) | % $SiO_2$ | pH@ 25° C. | Specific gravity (g/ml) | Visual appearance |
|---|---|---|---|---|
| 45 | 45% | 9-11 | 1.32 | white/ off-white |

20 grams of sodium formate was added to the 80 g of alkaline nanosilica dispersion in the beaker. The dispersion was mixed well using a stirrer. The mixture of the alkaline nanosilica dispersion and sodium formate was subjected to static aging at 250° F. for 16 hours. After 16 hours of static aging, the mixture formed a gelled solid.

Unless defined otherwise, all technical and scientific terms used have the same meaning as commonly understood by one of ordinary skill in the art to which these systems, apparatuses, methods, processes and compositions belong.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

"Optionally" means that the subsequently described event or circumstances may or may not occur. The description includes instances where the event or circumstance occurs and instances where it does not occur.

When the word "approximately" or "about" are used, this term may mean that there can be a variance in value of up to +10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed:

1. A loss circulation material, comprising:

an alkaline nanosilica dispersion, wherein the alkaline nanosilica dispersion comprises alkaline silica nanoparticles in a range from 5 wt. % to 65 wt. %, the alkaline silica nanoparticles have a $SiO_2$ content in a range from 20 wt. % to 65 wt. %, and the alkaline silica nanoparticles have a surface area in a range from 100 $m^2/g$ to 500 $m^2/g$; and, a formate activator, wherein the formate activator is present in an amount in a range of 1 wt. % to 40 wt. % of the loss circulation material and the formate activator is selected from the group consisting of sodium formate, potassium formate, cesium formate, and combinations thereof; and, further comprising a base material additive selected from the group consisting of polymers, corn stalks, rice hulls, cotton burrs, corn cobs, tree bark, animal hair, mineral fibers, citrus pulp, shredded paper, ground peanut shells, mica flakes, mica, fibrous material, cellophane, walnut shells, flaky material, plastic pieces, marble, wood, wood chips, formica, plant fibers, cottonseed hulls, ground rubber, polymeric materials, nut hulls, and combinations thereof.

2. The loss circulation material of claim 1, wherein the alkaline nanosilica dispersion has a pH in a range from 8.5 to 11.5.

3. The loss circulation material of claim 1, further comprising a gelation accelerator an acidic gelation accelerator selected from the group consisting of organic acids, mineral acids, and combinations thereof.

4. The loss circulation material of claim 3, wherein the gelation accelerator mixes with the loss circulation material to decrease a pH of the loss circulation material.

5. The loss circulation material of claim 4, wherein the loss circulation material has an initial pH range of 8.5 to 11.5.

6. The loss circulation material of claim 4, wherein a decreased pH range of the loss circulation material is from 2 to 4.

* * * * *